United States Patent
King, III et al.

(10) Patent No.: US 8,143,549 B2
(45) Date of Patent: Mar. 27, 2012

(54) APPARATUS FOR BUTT-WELDING TUBE JOINTS

(75) Inventors: William Bryan King, III, Atlanta, GA (US); Pedro Ernesto Amador, Lawrenceville, GA (US)

(73) Assignee: Aquilex WSI LLC, Atlanta, GA (US)

( * ) Notice: Subject to any disclaimer, the term of this patent is extended or adjusted under 35 U.S.C. 154(b) by 263 days.

(21) Appl. No.: 12/419,134

(22) Filed: Apr. 6, 2009

(65) Prior Publication Data
US 2009/0250437 A1    Oct. 8, 2009

Related U.S. Application Data

(60) Provisional application No. 61/042,626, filed on Apr. 4, 2008.

(51) Int. Cl.
*B23K 1/00* (2006.01)
*B23K 11/00* (2006.01)
(52) U.S. Cl. .......................................... 219/57; 219/59.1
(58) Field of Classification Search .................. 219/59.1, 219/60 R, 60.2, 61, 60 A, 125.11
See application file for complete search history.

(56) References Cited

U.S. PATENT DOCUMENTS

| | | | |
|---|---|---|---|
| 3,678,239 A * | 7/1972 | Hill | 219/60 A |
| 4,372,474 A | 2/1983 | Taff | |
| 4,495,400 A | 1/1985 | Thompson | |
| 4,554,429 A * | 11/1985 | Kazlauskas | 219/60.2 |
| 4,841,115 A | 6/1989 | Severin et al. | |
| 5,227,601 A | 7/1993 | Black | |
| 5,571,431 A * | 11/1996 | Lantieri et al. | 219/130.01 |
| 2007/0297556 A1 | 12/2007 | Spencer et al. | |

FOREIGN PATENT DOCUMENTS

| | | | |
|---|---|---|---|
| EP | 0484125 A2 | | 6/1992 |
| JP | 60240376 A | * | 11/1985 |
| JP | 2000317632 A | * | 11/2000 |

OTHER PUBLICATIONS

European Office Action issued against Application No. 09157447.5 dated May 25, 2010.
European Search Report for European Patent Application No. 09157447.5—2303, Jul. 20, 2009, Europe.

* cited by examiner

*Primary Examiner* — Sang Paik
(74) *Attorney, Agent, or Firm* — Greenberg Traurig, LLP

(57) ABSTRACT

Welding devices and methods of using the same are provided. The welding device includes a rotor assembly. The rotor assembly includes a first semi-collar associated with a second semi-collar to form a collar. The collar is adapted to be disposed about a tube to be welded, and associated with an automatic voltage control assembly. The automatic voltage control assembly is mechanically associated with an electrode, and the automatic voltage control maintains the desired angular disposition of the electrode relative to the tube to be welded.

13 Claims, 5 Drawing Sheets

APPARATUS FOR BUTT-WELDING TUBE JOINTS

CROSS REFERENCE TO RELATED APPLICATIONS

This patent application claims the benefit, and priority, of U.S. Provisional Patent Application No. 61/042,626, filed Apr. 4, 2008.

BACKGROUND OF THE INVENTION

1. Field of the Invention

The invention relates to an apparatus for use in creating butt-weld joints for tubes arranged in a restricted-radial-clearance arrangement.

2. Description of the Related Art

Boiler tubes may be subjected to high temperature and may experience relatively high stress and strain, which may lead to wear. Accordingly, at times, it is necessary to replace the tubes, or portions of the tubes within a boiler. Such replacement includes identifying a tube, or portion of a tube, to be replaced, removing a damaged portion of the tube, and butt-welding a new portion to a lower portion of the original tube.

Boiler tubes, however, are often tightly bundled having narrow radial gaps between adjacent tubes, which makes butt-welding difficult. For example, the tubes may be arranged with a minimum radial clearance between latitudinally adjacent tubes ranging from about 0.5 inches, or less, to about 3 inches, alternatively from about 1.5 inches to about 3 inches. The tubes may also be arranged with a minimum radial clearance between longitudinally adjacent tubes ranging from about 2 inches, or less, to about 4 inches.

SUMMARY OF THE INVENTIONS

Various illustrative embodiments of the present invention provide welding devices and methods of butt welding. In accordance with one aspect of an illustrative embodiment of the present invention a welding apparatus having a rotor assembly may be provided. The rotor assembly may include a first semi-collar associated with a second semi-collar to form a collar. The collar may be adapted to be disposed about a tube to be welded, and associate with an automatic voltage control assembly. The automatic voltage control assembly may be mechanically associated with an electrode, and the automatic voltage control assembly may maintain a desired angular disposition of the electrode relative to the tube to be welded.

In accordance with another aspect of an illustrative embodiment of the present invention, a welding apparatus having a rotor assembly may be provided. The rotor assembly may include a first semi-collar associated with a second semi-collar to form a collar. The collar may be adapted to be disposed about a tube to be welded, and associate with an automatic voltage control assembly. The automatic voltage control assembly may be mechanically associated with an electrode, and the automatic voltage control assembly may maintain a desired angular disposition of the electrode relative to the tube to be welded. The automatic voltage control assembly may further have a swing arm member pivotally connected to the collar. The swing arm member may include a gear box and an edge surface, wherein the edge surface has a plurality of gear teeth. The at least one gear may be engageable with the plurality of gear teeth to cause pivotal movement of the swing arm member and the electrode associated with the voltage control assembly.

In accordance with an aspect of an alternative illustrative embodiment of the present invention, a welding apparatus having a rotor assembly may be provided. The rotor assembly may include a first semi-collar associated with a second semi-collar to form a collar. The collar may be adapted to be disposed about a tube to be welded, and associate with an automatic voltage control assembly. The automatic voltage control assembly may be mechanically associated with an electrode, and the automatic voltage control assembly may maintain a desired angular disposition of the electrode relative to the tube to be welded. The second semi-collar may include an interior surface having a plurality of gear teeth disposed thereon. The automatic voltage control assembly may include a swing arm member pivotally connected to the first semi-collar and having a gear box and at least one gear. The at least one gear may be engageable with the plurality of gear teeth to cause pivotal movement of the swing arm member and the electrode associated with the voltage control assembly.

In accordance with an aspect of an alternative illustrative embodiment of the present invention, a method of welding may be provided. The method may include associating a welding apparatus to the first tube, wherein the welding apparatus includes a rotor assembly. The rotor assembly may include a first semi-collar releasable engaged with a second semi-collar to form a collar to be disposed about the first tube. The collar may have an automatic voltage control assembly mechanically associated with a welding electrode. The method may further include butt-welding at least a portion of the first tube to the second tube, and obtaining a first voltage measurement of the voltage across a gap between the welding electrode and the first and second tubes. The method may also include determining a deviation from the first voltage measurement of the voltage across the gap between the welding electrode and the first and second tubes; and adjusting an angular disposition of the welding electrode relative to the first and second tubes an amount sufficient to return the voltage across the gap between the electrode and the tubes to be welded to substantially the first voltage measurement.

BRIEF DESCRIPTION OF THE DRAWING

The present welding apparatus may be understood by reference to the following description taken in conjunction with the accompanying drawing figures, which are not to scale and contain certain aspects in exaggerated or schematic form in the interest of clarity and conciseness, wherein the same reference numerals are used throughout this description and in the drawings for components having the same structure, and primed reference numerals are used for components having a similar and function construction to those elements bearing the same unprimed reference numerals, and wherein.

DETAILED DESCRIPTION OF THE SPECIFIC EMBODIMENTS

Figure 1:
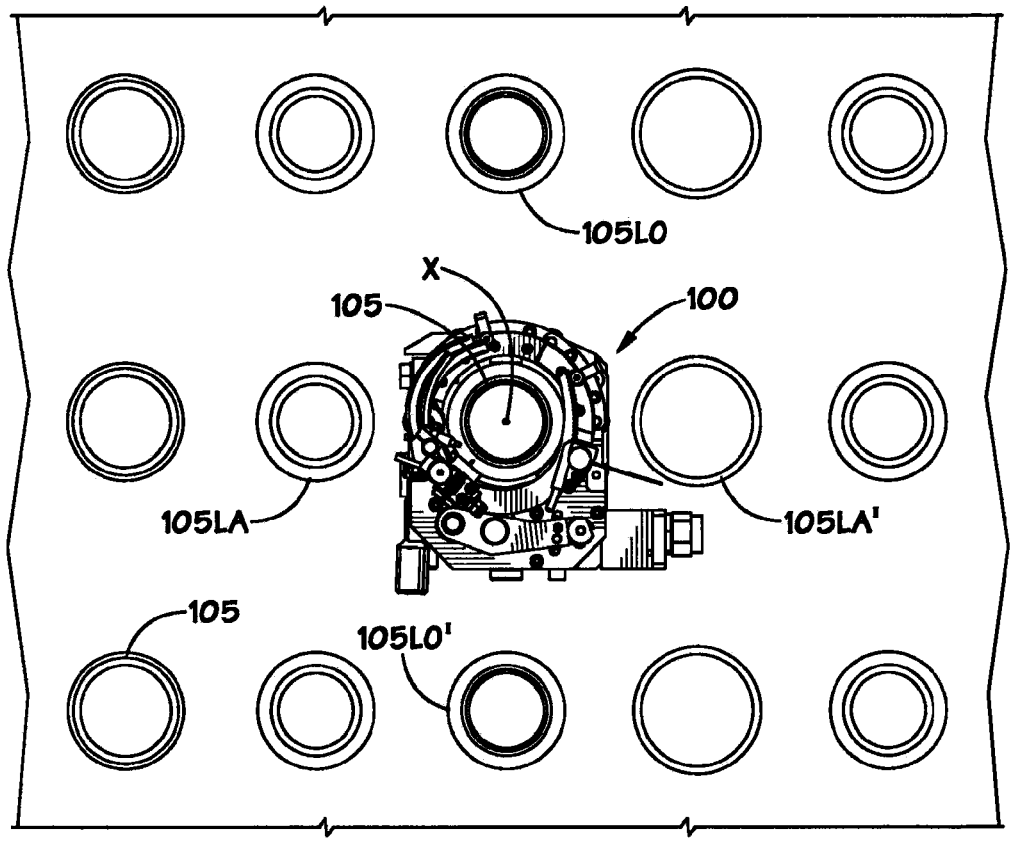
FIG. 1 is a top view of a plurality of tubes having an illustrative embodiment of the present welding apparatus affixed to one of the tubes to be butt-welded.

FIG. 1 is an illustrative embodiment of a welding apparatus 100, which is affixed to one of a plurality of tubes 105. In an embodiment, the tubes 105 are boiler tubes located within the convection section of a boiler (not shown), and a tube 105 is to be butt-welded to a new tube 105; however, the tubes 105 may be any tube, pipe, or cylindrical object capable of being butt-welded. The tubes 105 are generally illustrated in FIG. 1 as being arranged in a restricted-radial-clearance arrangement, having a narrow radial gap between adjacent tubes 105. In an embodiment, the radial clearance between latitudinally adjacent tubes 105LA and 105'LA, located 0 degrees and 180 degrees, from a tube longitudinal axes, x, ranges from about 0.5 inches, or less, to about 3 inches, alternatively from about 1.5 inches to about 3 inches, and the minimum radial clearance between longitudinally adjacent tubes 105LO and 105'LO, located 90 degrees and 270 degrees, from the tube longitudinal axis, x, ranges from about 2 inches, or less, to about 4 inches. Moreover, the plurality of tubes 105 are generally illustrated in FIG. 1 as arranged in a general rectangular configuration comprised of substantially perpendicular rows and columns of tubes 105, however, various other configurations are contemplated, such as trapezoidal, triangular, diamond shaped, or random configurations.

Figure 2:
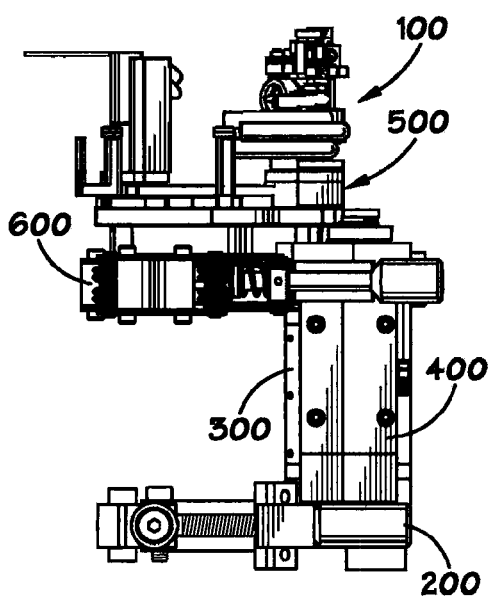
FIG. 2 is a side view of the welding apparatus of FIG. 1 disengaged from the tube.
Figure 3:
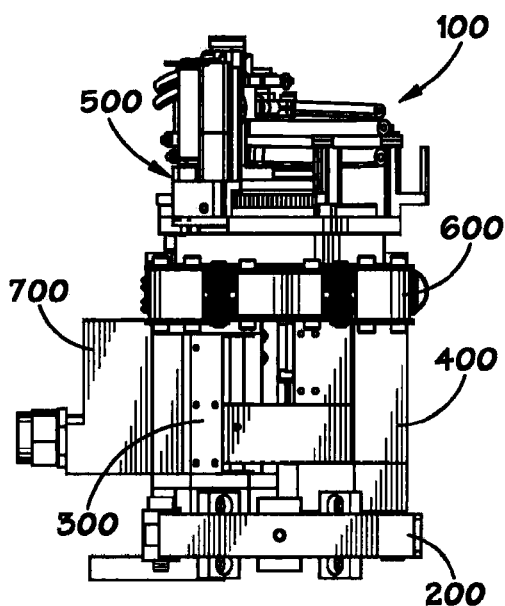
FIG. 3 is a rear view of the welding apparatus of FIG. 1 disengaged from the tube.
Figure 4:
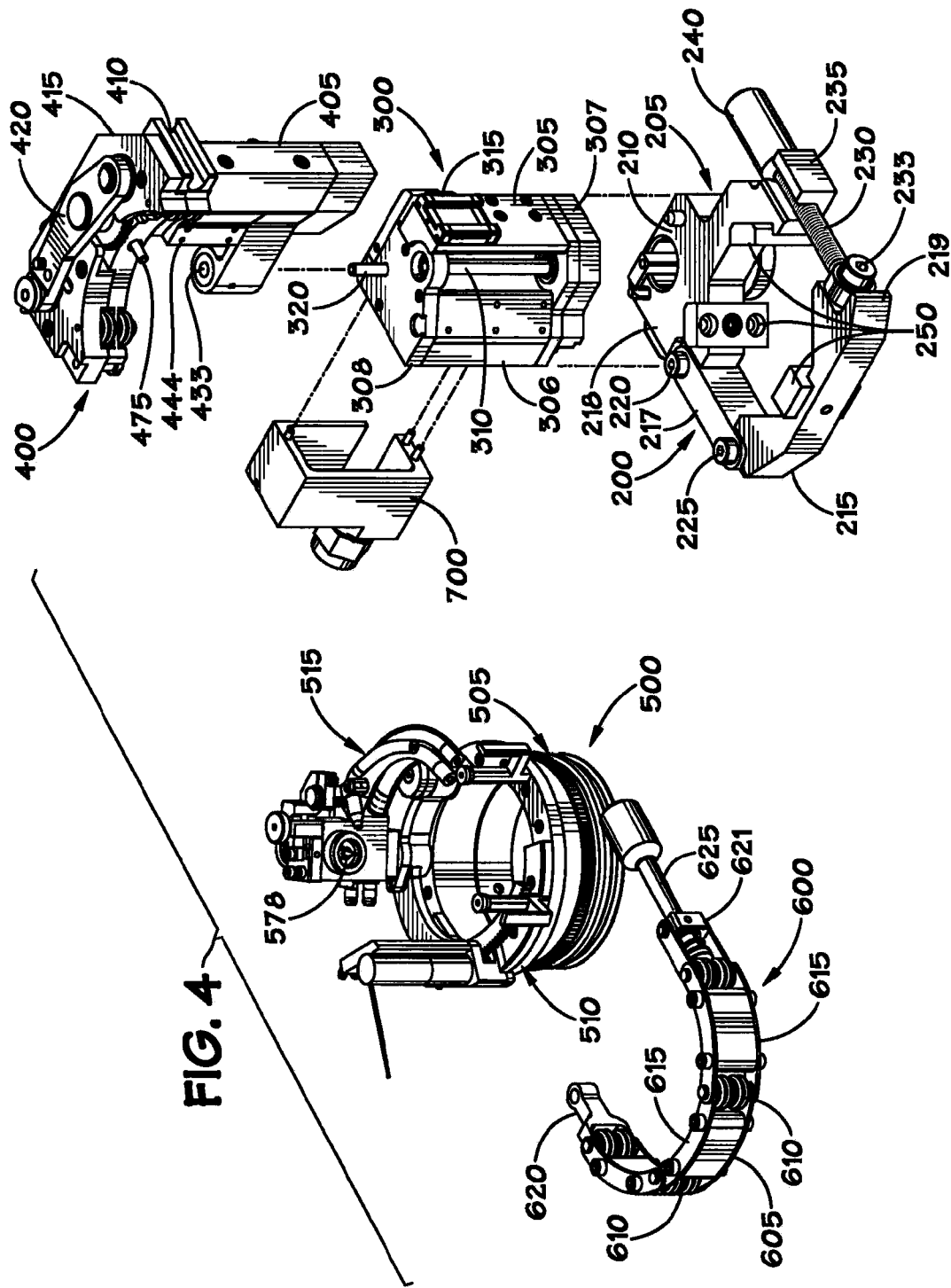
FIG. 4 is an exploded view of an illustrative embodiment of the present welding apparatus.

With reference to FIGS. 1-4, an illustrative embodiment of the welding apparatus 100 is shown, wherein the welding apparatus 100 is shown in FIGS. 2-4 as disengaged from the tubes 105. The welding apparatus 100 may generally include six assemblies or elements: a clamp, or base, assembly 200, an oscillator assembly 300, a drive assembly 400, a rotor assembly 500, a chain assembly 600, and a junction box 700. The clamp assembly 200 may be affixed, or clamped, to a tube 105 to be butt-welded. In an embodiment, the clamp assembly 200 may act as a stationary platform to which the oscillator assembly 300 may be affixed, or mounted. In an embodiment, the oscillator assembly 300 may have components adapted to rotate a lead screw 310 to which a lead nut 433 of the drive assembly 400 is affixed, or mounted. A linear rail 444 of the drive assembly 400 may engage a bearing block 315 of the oscillator assembly 300. In this manner, the drive assembly 400 may move, or otherwise be driven, up and down the lead screw 310 of the oscillator assembly 300. The drive assembly 400 may further act to drive, or otherwise move, or rotate, the rotor assembly 500 around a tube 105. The chain assembly 600 may act to retain the rotor assembly 500 against, or about, a tube 105 and prevent the rotor assembly 500 from disengaging from the drive assembly 400. The junction box 700 may be affixed to the oscillator assembly 300, and may serve to receive and retain various cables and hoses, hereinafter described.

Still with reference to FIGS. 1-4, welding apparatus 100 may be secured to a tube 105. In an embodiment, a method of securing the welding apparatus 100 to a tube 105 may include disposing a base, or clamp, assembly 200 about a tube 105 to be welded to another tube. An oscillating assembly 300 may be mounted to the base assembly 200. A drive assembly 400 may be mounted to the oscillating assembly 300. A threaded rod 475 (FIG. 4) may extend through a portion of the drive assembly 400 and temporarily secure the drive assembly 400 to an AVC semi-collar 503 hereinafter described with reference to FIG. 6. The non-AVC semi-collar 506 hereinafter described with reference to FIG. 6 may be slid into, or otherwise engage, or be received by, the AVC semi-collar 503, hereinafter described with reference to FIG. 6, about a tube 105 to attach, or otherwise affix, the rotor assembly 500 about a tube 105. A chain assembly 600 may be secured to the drive assembly 400 about the rotor assembly 500. Once the chain assembly 600 is secured to the drive assembly 400 about the rotor assembly 500, the threaded rod 475 may be released to allow rotation of the rotor assembly 500 about the tube 105. A junction box 700 may be affixed to the oscillation assembly 300 to receive and organize various cables (not shown).

An Embodiment of the Clamp Assembly

With reference to FIG. 4, the clamp, or base, assembly 200 may be any device suitable to act as a stable base for supporting the oscillator assembly 300, drive assembly 400, rotor assembly 500, chain assembly 600, and junction box 700. In an embodiment, the clamp assembly 200 may include a back piece, or support member, 205 having a platform surface 210. The back piece 205 may be adapted to receive, or support the oscillator assembly 300. A swing gate 215 may be pivotably attached at a first swing gate end 217 about a first pin 220 to a first back piece end 218 of the back piece 205. The swing gate 215 may pivot radially about at least the first pin 220 and about a second pin 225, disposed intermediate the first swing gate end 217 and a second swing gate end 219. The swing gate 215 may further include a pivotable threaded latch piece, or member, 230 at the second swing gate end 219, which is pivotably affixed about a third pin 233. The threaded latch member 230 may further be in rotational alignment with a recessed portion 235 of the back piece 205, and the threaded latch member 230 may fit within a recess of the recessed portion 235. An internally-threaded cap piece 240 may be screwed about the threaded latch member 230 until the internally-threaded cap member 240 engages a back end of the recessed portion 235. In an embodiment, spacers or cushions 250 may be provided to prevent the tube (105 in FIG. 1) from being damaged and/or ensure a snug engagement between the tube (105 in FIG. 1) and the clamp assembly 200.

An Embodiment of the Oscillator Assembly

The oscillator assembly 300 may include a oscillator housing 305 having a base plate 307 and an upper plate 308. The base plate 307 may be affixed to, secured to, or disposed against, the platform surface 210 of the clamp assembly 200. A lead screw 310, may be rotatably affixed to the base plate 307 and upper plate 308. The oscillator housing 305 may include conventional internal components (not shown) adapted to rotate the lead screw 310. Preferably, the lead screw 310 is adapted to receive, or otherwise engage, a lead nut 433 of the drive assembly 400.

The housing 305 may further include a bearing block 315, preferably including internal ball bearings (not shown), adapted to receive a linear rail 444 of the drive assembly 400. The oscillator assembly 300 may further include linear position sensors 320 (only one linear position sensor shown), such as a linear position resistor or a linear potentiometer, alternatively the linear position sensors 320 may be guide pins, to ensure that the oscillator assembly 300 and drive assembly 400 remain aligned with respect to each other. In this manner, rotation of the lead screw 310 may move, or drive, the lead nut 444 of the drive assembly 400 up and down the lead screw 310, and the engagement of the bearing block 315 with the linear rail 444 may ensure a more smooth, and rotation free, movement of the drive assembly 400 relative to the oscillator assembly 300.

An Embodiment of the Drive Assembly

Figure 5:
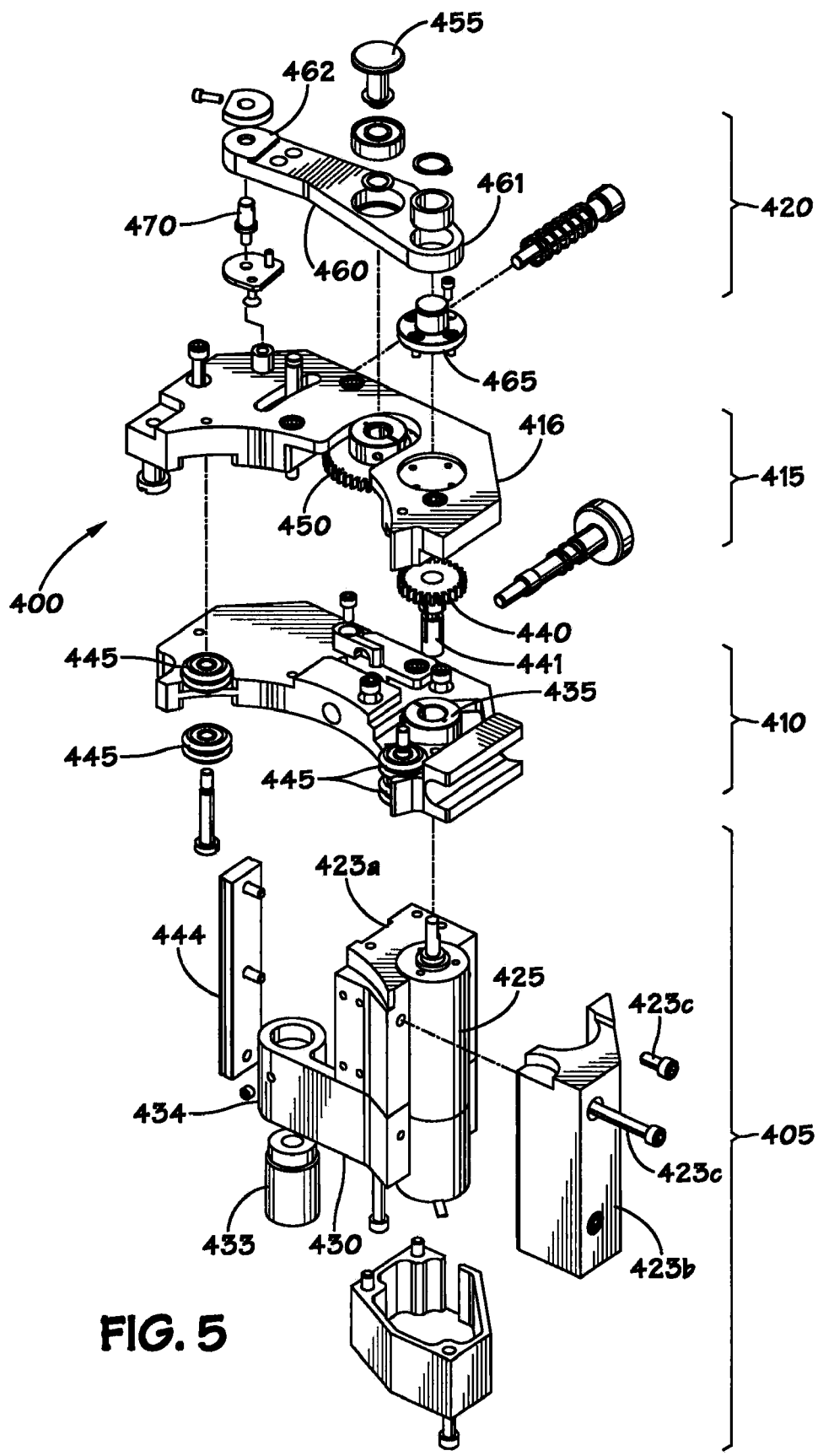
FIG. 5 is an exploded view of an illustrative embodiment of a drive assembly of the present welding apparatus.

With reference to FIGS. 4 and 5, the drive assembly generally includes four components, or assemblies: a housing 405, a lower drive member 410, upper drive member 415, and a clutch member 420. Housing 405 may include motor mount members 423a and 423b for a drive assembly motor 425. The motor mount members 423a and 423b may be secured to each other by any suitable means including pins and screws 423c. The drive assembly motor 425 may be any suitable motor such as an a/c motor, or a d/c motor. Preferably, drive assembly motor 425 is a d/c motor. Of course, if desired, other types of motors such as a hydraulic motor may be utilized. An arm member 430 may be affixed to, secured to, or integral with, the housing 405. The arm 430 may have at a first arm end 434 a lead nut 433. The lead nut 433 of the arm 430 may be, internally threaded, or otherwise adapted for engagement with the lead screw 310 to drive, or move, the drive assembly 400 up and down the lead screw 310, as described above.

The lower drive member 410 may be affixed to, or secured to, the motor mount member 423a and 423b by pins, screws, sliding engagement, bolts and the like. The lower drive member 410 may include a hollow seat 435 through which a stem 441 of a first spur gear 440 may be disposed, and engage the drive assembly motor 425. In this manner, the drive assembly motor 425 may drive the first spur gear 440. In an embodiment, a plurality of v-shaped drive assembly wheels 445 are affixed along an inner radial edge of the lower drive member 410. In a still further embodiment, two sets of horizontally stacked v-shaped drive assembly wheels 445 are affixed near either end of the inner radial edge of the lower drive member 410.

Continuing with respect to FIG. 5, the upper drive member 415 may include a recessed portion (not shown) for receiving the first spur gear 440, and the lower drive member 410 and the upper drive member 415 may be affixed to each other. The first spur gear 440 maybe further adapted to be linked with, or engage, a second spur gear 450, which may drive the rotor assembly 500, as described in greater detail below. The second spur gear 450 may be further affixed to a drive assembly pin 455, which may extend through an aperture in the upper drive member 415 and an aperture in the clutch member 420 to mate, or engage, the clutch member 420 to the second spur gear 450.

The clutch member 420 may include a clutch arm member 460 which may have any shape, and in an embodiment is generally arched or "boomerang" shaped. In an embodiment, the clutch arm member 460 is pivotally affixed at a first clutch arm end 461 to a guide pin 465, engaged with, recessed within, or secured to a first upper drive member end 416. In this manner, the guide pin 465 prevents the clutch arm member 460 from pivoting beyond the plane of the upper drive portion 415. At a second clutch arm end 462 may be disposed, affixed, or secured a keeper pin 470, which is affixed to the upper drive portion 415. In an embodiment, depressing the clutch arm member 460 against the keeper pin 470 lowers the second drive gear 450, and disengages the clutch arm member 460 from the first drive gear 440. Releasing, or otherwise lifting, the keeper pin 470 may re-engage the second drive gear 450 with the first drive gear 440. Moreover, pivoting the clutch arm member 460 away from the center of the welding apparatus 100 may disengage the second drive gear 450 from the rotor assembly 500; however, pivoting the clutch arm member 460 toward the center of the welding apparatus 100 may move the second drive gear 450 outside of the plane of the upper drive portion 415 and into engagement with the rotor assembly 500.

An Embodiment of the Rotor Assembly

Figure 6:
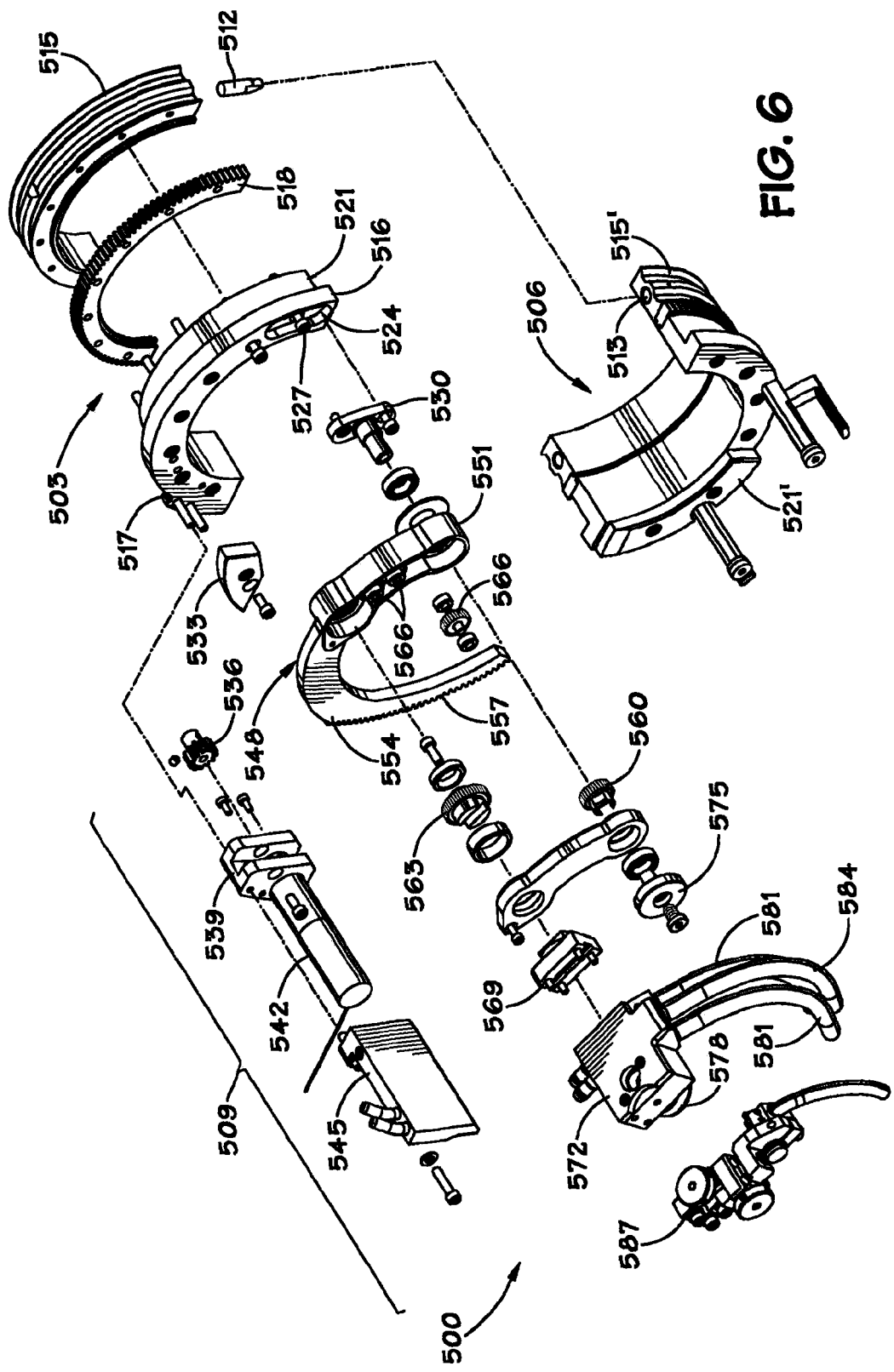
FIG. 6 is an exploded view of an illustrative embodiment of a rotor assembly of the present welding apparatus.

With reference to FIGS. 3, 4, and 6, the rotor assembly 500 may include three components, or assemblies: an automatic voltage control ("AVC"), generally semi-circular shaped collar member, or semi-collar, 503; a non-AVC, generally semi-circular shaped collar member, or semi-collar, 506; and an AVC assembly 509. For ease of reference and clarity of understanding, the AVC semi-collar 503 and the AVC assembly 509 are illustrated in an exploded view in FIG. 6. The AVC semi-collar 503 and the non-AVC semi-collar 506 may be removeably affixed, or attached, to each other by pins, bolts, screws, sliding engagement, and the like. In an embodiment, the AVC semi-collar 503 and the non-AVC semi-collar 506 are removeably affixed, or attached, to each other by two pins 512 (only one being pin shown in FIG. 6), which may be received within mating opening 513 formed in non-AVC semi collar 506. When engaged, or attached together, the AVC semi-collar 503 and the non-AVC semi-collar 506 form a generally hollow cylinder, cylindrical shaped collar, or collar, though which a tube (105, FIG. 1) to be welded may be disposed.

Each of the AVC semi-collar 503 and the non-AVC semi-collar 506 have associated therewith: a v-shaped, wheel raceway members 515, 515'; a gear wheel 518 having a plurality of gear teeth thereon; and a top plate member 521, 521'. The raceway members 515, 515', gear wheel 518, and top plate members 521, 521' may be adapted to be bolted, or otherwise suitably affixed, or attached, together as shown in FIG. 6, with respect to non-AVC collar 506. The gear wheel 518 may be further adapted to be engaged with the second spur gear 450 (FIG. 5) of the drive assembly 400. In this manner, when gear wheel 518 is engaged with the second spur gear 450, rotation of the second spur gear 450 may rotate the gear wheel 518 and rotor assembly 500. The v-shaped, wheel raceway member 515, 515' of the rotor assembly 500 may be adapted to receive the v-wheels 445 (FIG. 5) of the drive assembly 400. In this manner, the rotor assembly 500 and the drive assembly 400 may remain aligned during rotation, and the rotor assembly 500 may undergo a more smooth rotation. The configuration of raceway member 515, 515' may be other than v-shaped, such as a u-shaped, or any other suitable configuration.

The top plate member 521 on the AVC semi-collar 503 may serve as a platform upon which the AVC assembly 509 may be disposed, mounted, or secured. In an embodiment, a portion of the top plate member 521 on the AVC semi-collar 503 at a first end 516 may include a recessed portion 524 and a top plate pin 527 adapted to receive a pivotal connection member 530. In an embodiment, a portion of the top plate member 521 on the AVC semi-collar 503 at a second end 517 may include a mounting member 533 adapted to receive a swing-arm gear 536 and a swing-arm motor mount 539. The swing-arm motor mount 539 may support, or otherwise receive, a swing-arm motor 542. The swing-arm motor 542 may be an electric a/c motor or an electric d/c motor, and is preferably an electric d/c motor. Of course, if desired, other types of motors such as a hydraulic motor may be utilized. The swing-arm motor mount 539 may additionally support, or otherwise receive, a swing-arm motor cooling block 545. During operation of the welding apparatus 100, cooling fluid, such as water, or any other suitable cooling material, may be run though the swing-arm motor cooling block 545 to cool the swing-arm motor 542.

A swing arm member 548 may have a generally arched shaped, or semi-circular, configuration, and may include a gear box 551 as well as an edge surface 554 having gear teeth 557. The gear box 551 may be further adapted to receive at one end the pivotal connection member 530. In this manner, the gear box 551 and edge surface 554, or swing arm member 548, may pivot together about the pivotal connection 530. The gear teeth 557 of the edge surface 554 may be thus engage the gear teeth of the swing-arm gear 536. Accordingly, the swing-arm motor 542 may cause the swing-arm gear 536 to rotate, which in turn causes the swing arm member 548 to pivot about the pivotal connection 530.

Associated with the gear box, or housing, 551 may be any number of gears, preferably an odd number of gears. In an embodiment, the gear box 551 provides a housing for, or receives, a stationary gear 560, a torch gear 563, and a plurality of intermediary gears 566. In an embodiment, the stationary gear 560 may be provided at one end of the gear box 551 and disposed upon the pivotal connection 530. In this manner, movement of the swing arm member 548 about the pivotal connection 530 may additionally rotates the stationary gear 560. At the other end of the gear box 551 may be disposed the torch gear 563. Any number of intermediary gears 566, preferably an odd number, may be placed in mechanical engagement to link the stationary gear 560 and the torch gear 563. A bracket 569 may be mounted to the torch gear 563. The bracket 569 may be further adapted to serve as a mounting member to which a torch block 572 may be mounted, in an embodiment the bracket 569 may be made of a material suitable to electrically insulate the apparatus 100 from the torch block 572. Accordingly, rotation of the swing-arm member 548—driven by rotation of the swing-arm gear 536 powered by the swing-arm motor 542—about the pivotal connection 530 may cause the stationary gear 560 to rotate, which in turn may rotate the intermediary gears 566, which in further turn may rotate the torch gear 563, which may pivot, or rotate, the bracket 569, which may further pivot, or rotate, the torch block 572. In an alternatively embodiment, the stationary gear 560 remains still, or stationary, and rotation of the swing-arm member 548—driven by rotation of the swing-arm gear 536 powered by the swing-arm motor 542—about the pivotal connection 530 may cause at least one of the intermediary gears 566 to rotate around, or roll around, the stationary gear 560, which in turn may rotate the remaining intermediary gears 566, which in further turn may rotate the torch gear 563, which may pivot, or rotate, the bracket 569, which may further pivot, or rotate, the torch block 572. Further, a thumb knob 575 may be associated with the gear box 551 and in engagement with, or attached to, the stationary gear 560. In this manner, the stationary gear 560 may be manually rotated by rotation of the thumb knob 575, which may provide manual adjustment of the lead/lag angle, or angular disposition, between a welding electrode, or electrode, 578 disposed upon the torch block 572, and the new tube 105 to be butt-welded to tube 105.

Disposed upon the torch block 572 may be the welding electrode, or electrode, 578 (FIG. 4 and FIG. 6), two cooling tubes 581, an inert gas tube 584, and a welding wire manipulator, or welding wire supply device, 587. In an embodiment, the electrode 578 may have a tungsten tip. The cooling tubes 581 may transmit a suitable cooling fluid, such as water, through the torch block 572 and the swing-arm motor cooling block 545 to reduce the temperature of those components and their surrounding elements. The inert gas tube 584 may carry an inert gas, such as argon, to be blown on the weld to minimize, or prevent, oxidation as the weld is being formed. The wire manipulator 587 may supply welding wire used in the formation of the weld for a tube (105, FIG. 1).

An Alternative Embodiment of the Rotor Assembly

Figure 7:
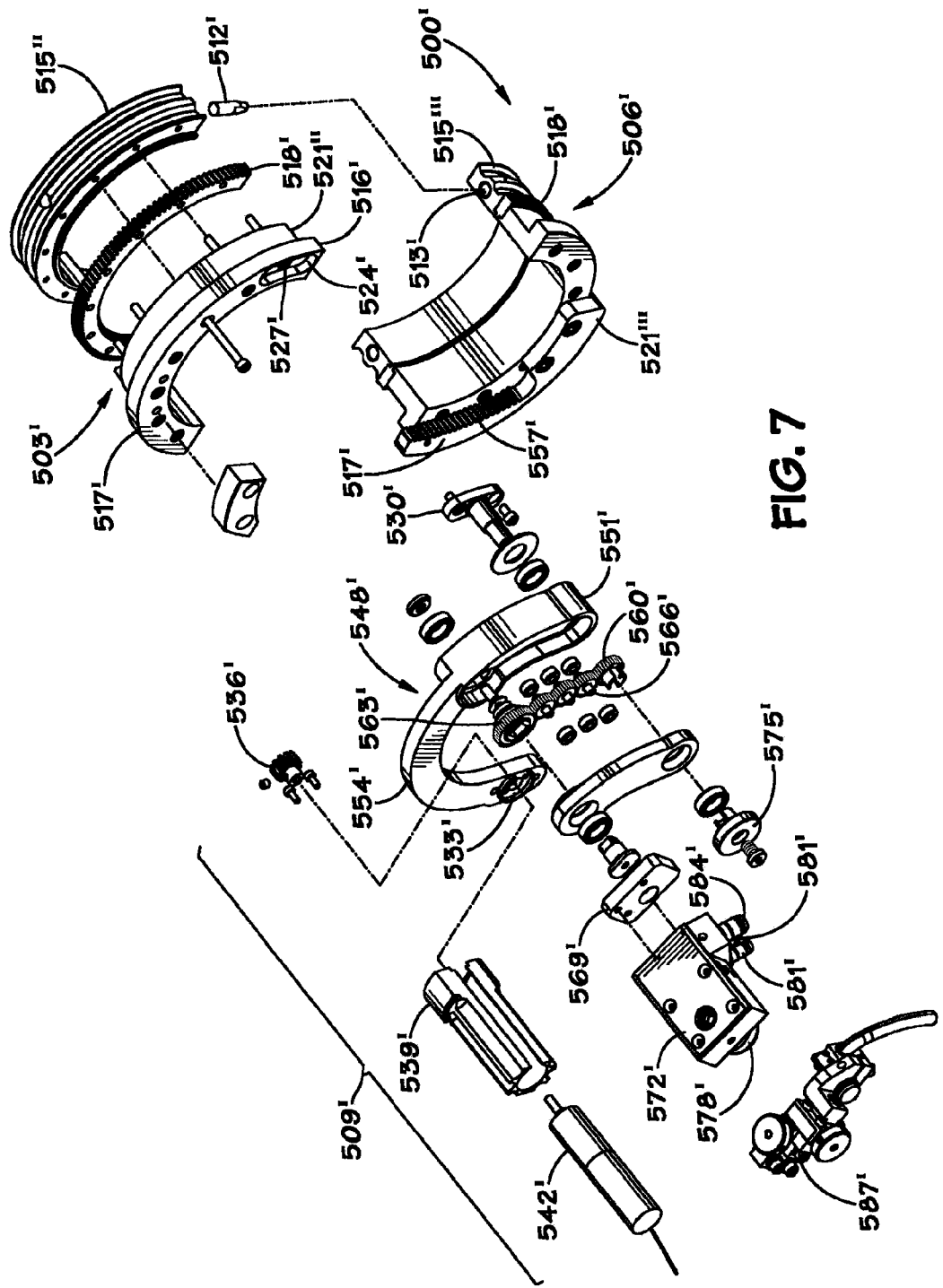
FIG. 7 is an exploded view of an alternative illustrative embodiment of a rotor assembly of the present welding apparatus.

An alternative embodiment of rotor assembly 500' is illustrated in FIG. 7. The rotor assembly 500' may generally have associated therewith: an automatic voltage control ("AVC"), generally semi-circular shaped collar member, or semi-collar 503', a non-AVC, generally semi-circular shaped collar member, or semi-collar 506', and an AVC assembly 509'. For ease of reference and clarity of understanding, the AVC semi-collar 503' and the AVC assembly 509' are illustrated in an exploded view in FIG. 7. The AVC semi-collar 503' and the non-AVC semi-collar 506' may be removeably affixed, or attached, to each other by pins, bolts, screws, sliding engagement, and the like. In an embodiment, the AVC semi-collar 503' and the non-AVC semi-collar 506' are removeably affixed to each other by two pins 512' (only one pin shown), which may be received within mating opening 513' formed in non-AVC semi-collar 506'. When engaged, the AVC semi-collar 503' and the non-AVC semi-collar 506' form a hollow cylinder, or collar, though which a tube (shown in FIG. 1) to be welded may be disposed.

Each of the AVC semi-collar 503' and the non-AVC semi-collar 506' may have associated therewith: v-shaped, wheel raceway members 515" and 515'''; a gear wheel 518' having a plurality of gear teeth thereon; and a top plate member 521", 521'''. The raceway members 515", 515''', gear wheel 518', and top plate members 521", 521''' may be adapted to be bolted, or otherwise suitably affixed, or attached together as shown in FIG. 7, with respect to non-AVC collar 506'. The gear wheel 518' may be further adapted to be engaged with the second spur gear 450 of the drive assembly 400. In this manner, when the toothed wheel 518' is engaged with the second spur gear 450, rotation of the second spur gear 450 may rotate the gear wheel 518' and rotor assembly 500'. The v-shaped, wheel raceway member 515', 515''' of the rotor assembly 500' may be adapted to receive the v-wheels 445 (FIG. 5) of the drive assembly 400. In this manner, the rotor assembly 500' and the drive assembly 400 may remain aligned during rotation, and the rotor assembly 500' may undergo a more smooth rotation. The configuration of raceway member 515", 515''' may be other than v-shaped, such as u-shaped, or any other suitable configuration.

The top plate member 521' on the AVC semi-collar 503' may serve as a platform upon which the AVC assembly 509' may be disposed, mounted, or secured. In an embodiment, a portion of the top plate 521' on the AVC semi-collar 503' at a first top plate end 516' may include a recessed portion 524' and a top plate pin 527' adapted to receive a pivotal connection 530'. In an embodiment, the top plate 521" on the non-AVC semi-collar 506' may include an edge surface 517' having teeth 557'.

A swing arm member 548' may by generally arched shaped, or semi-circular, configuration, and include a gear box 551' as well as an edge surface 554'. The edge surface 554' of the gear box 551' may be, in this embodiment, relatively smooth, or otherwise without teeth. The gear box 551' may be further adapted to receive near at one end the pivotal connection 530'. In this manner, the arched gear box 551' and edge surface 554', or swing arm member 548', may pivot together about the pivotal connection 530'. The edge surface 554' may be configured to receive, preferably near a first edge surface end 533', a swing-arm motor mount, or housing, 539'. A swing-arm motor 542' may be affixed to, or housed within, the swing-arm motor mount 539'. The swing-arm motor 542' may further be in mechanical communication with the swing-arm gear 536'. Further, the swing-arm gear 536' may be aligned in linked communication with the gear teeth 557' of the edge surface 517'. Accordingly, the swing-arm motor 542' may cause the swing-arm gear 536' to rotate, which in turn causes the swing arm member 548' to pivot about the pivotal connection 530'.

Associated with the gear box, or housing, 551' may be any number of gears, preferably an odd number of gears. In an embodiment, the gear box 551' provides a housing for, or receives, a stationary gear 560', a torch gear 563', and a plurality of intermediary gears 566'. In an embodiment, the stationary gear 560' may be provided at one end of the gear box 551' and disposed upon the pivotal connection 530'. In this manner, movement of the swing arm member 548' about the pivotal connection 530' may additionally rotates the stationary gear 560'. At the other end of the gear box 551' may be disposed the torch gear 563'. Any number of intermediary gears 566', preferably an odd number, may be placed in mechanical engagement to link the stationary gear 560' and the torch gear 563'. A bracket 569' may be mounted to the torch gear 563', in an embodiment the bracket 569' may be made of a material suitable to electrically insulate the apparatus 100' from the torch block 572'. The bracket 569' may be further adapted to serve as a mount to which a torch block 572' may be mounted. Accordingly, rotation of the swing-arm member 548'—driven by rotation of the swing-arm gear 536' powered by the swing-arm motor 542'—about the pivotal connection 530' may cause the stationary gear 560' to rotate, which in turn may rotate the intermediary gears 566', which in further turn may rotate the torch gear 563', which may pivot the bracket 569', which may further pivot the torch block 572'. In an alternatively embodiment, the stationary gear 560' remains still, or stationary, and rotation of the swing-arm member 548—driven by rotation of the swing-arm gear 536' powered by the swing-arm motor 542'—about the pivotal connection 530' may cause at least one of the intermediary gears 566' to rotate around, or roll about, the stationary gear 560', which in turn may rotate the remaining intermediary gears 566', which in further turn may rotate the torch gear 563', which may pivot, or rotate, the bracket 569', which may further pivot, or rotate, the torch block 572'. Further, a thump knob 575' may be provided through the gear box 551' and in communication with the stationary gear 560'. In this manner, the stationary gear 560' may be manually rotated by rotation of the thump knob 575', which may provide manual adjustment of the lead/lag angle, or angular disposition, between a welding electrode, or electrode, 578' disposed upon the torch block 572', and the new tube 105 to be butt-welded to tube 105.

Disposed upon the torch block 572' may be the electrode 578', two cooling tubes 581', an inert gas tube 584', and a wire manipulator, or welding wire supply device, 587'. In an embodiment, the electrode 578' may include a tungsten tip. The cooling tubes 581' may transmit a suitable cooling fluid, such as water, through the torch block 572' to reduce the temperature of those components and their surrounding elements. The inert gas tube 584' may carry an inert gas, such as argon, to be blown on the weld to minimize, or prevent, oxidation as the weld is being formed. The wire manipulator 587' may supply wire to be welded to the tube (105, FIG. 1).

An Embodiment of the Chain Assembly

As shown in FIGS. 2 and 4, the chain assembly 600 may include a chain 605 having a plurality of v-shaped, wheels, or rollers, 610 and pivotably mounted body members 615. In an embodiment, the rollers 610 engage the v-shaped raceway 525 member of rotor assemblies 500, 500' (FIGS. 6 and 7). In this manner, the rotor assembly 500 and the drive assembly 400 may remain aligned during rotation, and the rotor assembly 500 may undergo a more smooth rotation. One end 620 of the chain assembly 600 may be mounted, or pinned, to a connection member or 480 of drive assembly 400, and the other end 621 of the chain assembly 600 may include a locking extension, or locking member 625, which is received with a locking slot member 410, of the drive assembly 400. Locking member 625 may be threadely mounted to the other end 621 of the chain assembly 600, so that by rotating it to move locking member toward chain 605, the connection between locking member 615 and locking slot member 410 is tightened.

An Embodiment of a Method of Welding

With reference to FIGS. 1-7, the welding apparatus 100 is first placed over a tube 105 to be welded by an operator of the welding apparatus 100, who may hold the apparatus with his or her hands. As the welding apparatus 100 is operated to butt-weld a portion of an existing tube 105 to a new tube 105, a voltmeter (not shown) may measure the voltage across the weld gap, or distance between the tubes to be welded together and the electrode. Any appreciable change in voltage across the weld gap from an initial set point, for the desired voltage across the weld gap, may be caused by a change in the lead/lag angle, or angular disposition, between the electrode 578 and the new tube 105 to be butt-welded to tube 105. This change in voltage may signal apparatus 100 to actuate the swing-arm motor 542, which may drive the swing-arm gear 536 to pivot the swing arm 548 about the pivotal connection 530. Movement of the swing arm 548 may translate into rotation of the stationary gear 560, which in turn may rotate the intermediary gears 566, which may in turn rotate the torch gear 563. Rotation of the torch gear 563 may cause a rotation in the bracket 569, which may further pivot, or rotate, the torch block 572. Pivoting of the torch block will correct the lead/lag angle to the desired lead/lag angle and maintains the desired lead/lag angle between the electrode 578 and a radial line from the center of the new tube 105 to be butt-welded to a tube 105. This correction of the lead/lag angle preferably causes the voltage across the weld gap to return to its desired set point, which may signal apparatus 100 to stop the swing-arm motor 542. Thus, in an embodiment, the AVC assembly 509 maintains the desired lead/lag angle of the welding electrode 578 with respect to the tubes being butt-welded over the course of its travel, which allows the welding apparatus 100 to be able to weld a relatively large range of diameters of tubes 105. The desired lead/lag angle for electrode 578 is dependent upon the welder's preference and experience level, and is generally between about 2 degree and about 15 degrees lead from a radial line of the tubes, alternatively between about 3 degrees and 5 degrees.

While certain embodiments of the present welding apparatus have been described in connection with various preferred illustrative embodiments shown herein, it will be understood that it is not intended to limit the invention to those embodiments. On the contrary, it is intended to cover all alternatives, modifications, and equivalents, as may be included within the spirit and scope of the invention as defined by the appended claims.

The invention claimed is:

1. A welding apparatus having a rotor assembly comprising: a first semi-collar associated with a second semi-collar to form a collar; the collar having a swing arm member pivotally fixed thereto, and the collar adapted to disposed about a tube to be welded; an automatic voltage control assembly being pivotally fixed to the swing arm, and the automatic voltage control assembly being mechanically associated with an electrode; and the automatic voltage control assembly maintains a desired angular disposition of the electrode, by mechanical association between the swing arm and electrode, relative to the tube to be welded.

2. The welding apparatus of claim 1, wherein; the swing arm member includes a gear box and an edge surface having a plurality of gear teeth; and at least one gear which is engageable with the plurality of gear teeth to cause pivotal movement of the swing arm member and the electrode associated with the voltage control assembly.

3. The welding apparatus of claim 2, including a bracket rigidly affixed to a torch block and is rotateably affixed to a torch gear; the electrode is affixed to the torch block.

4. The welding apparatus of claim 3, including a motor for rotating the at least one gear; a cooling block is associated with the motor to shield the motor from heat emitted from the electrode.

5. The welding apparatus of claim 1, wherein the second semi-collar includes: an interior surface having a plurality of gear teeth disposed thereon; the automatic voltage control assembly includes the swing arm member pivotally connected to the first semi-collar and having a gear box and at least one gear, which is engageable with the plurality of gear teeth to cause pivotal movement of the swing arm member and the electrode associated with the voltage control assembly.

6. The welding apparatus of claim 5, including a bracket rigidly affixed to a torch block and is rotateably affixed to a torch gear; the electrode is affixed to the torch block.

7. A method of butt-welding a first tube to a second tube comprising:
associating a welding apparatus to the first tube, wherein the welding apparatus includes a rotor assembly comprising a first semi-collar releasably engaged with a second semi-collar to form a collar to be disposed about the first tube, the collar having a swing arm member pivotally fixed thereto, and an automatic voltage control assembly pivotally fixed the swing arm, and the automatic voltage control assembly being mechanically associated with a welding electrode;
butt-welding at least a portion of the first tube to the second tube;
obtaining a first voltage measurement of the voltage across a gap between the welding electrode and the first and second tubes;
determining a deviation from the first voltage measurement of the voltage across the gap between the welding electrode and the first and second tubes; and
adjusting an angular disposition of the welding electrode, by mechanical association between the swing arm and electrode, relative to the first and second tubes an amount sufficient to return the voltage across the gap between the electrode and the tubes to be welded to substantially the first voltage measurement.

8. The method of butt-welding of claim 7, further comprising: using the determined deviation from the first voltage measurement of the voltage across the gap between the welding electrode and first and second tubes the tube to drive a motor to pivotally move the voltage control assembly to change the angular disposition of the welding electrode.

9. The method of butt-welding of claim 8, wherein the swing arm member includes a gear box and an edge surface having a plurality of gear teeth; and at least one gear which is engageable with the plurality of gear teeth to cause pivotal movement of the swing arm member and the electrode associated with the voltage control assembly.

10. The method of butt-welding of claim 8, wherein the second semi-collar includes: an interior surface having a plurality of gear teeth disposed thereon; the automatic voltage control assembly includes the swing arm member pivotally connected to the first semi-collar and having a gear box and at least one gear, which is engageable with the plurality of gear teeth to cause pivotal movement of the swing arm member and the electrode associated with the voltage control assembly.

11. A welding apparatus comprising: a base assembly adapted to be removeably affixed to a first tube to be butt-welded; an oscillator assembly affixed to the base assembly, the oscillator assembly adapted to move a drive assembly affixed to the oscillator assembly; the drive assembly adapted to rotate a rotor assembly; and the rotor assembly further comprising, a first semi-collar associated with a second semi-collar to form a collar, the collar having a swing arm member pivotally fixed thereto, and the collar adapted to disposed about a tube to be welded an automatic voltage control assembly being pivotally fixed to the swing arm, and the automatic voltage control assembly being mechanically associated with an electrode, and the automatic voltage control assembly maintains a desired angular disposition of the electrode, by mechanical association between the swing arm and electrode, relative to the tube to be welded; a chain assembly adapted to retain the rotor assembly about the tube.

12. The welding apparatus of claim 11, wherein the swing arm member includes a gear box and an edge surface having a plurality of gear teeth; and at least one gear which is engageable with the plurality of gear teeth to cause pivotal movement of the swing arm member and the electrode associated with the voltage control assembly.

13. The welding apparatus of claim 11, wherein the second semi-collar includes: an interior surface having a plurality of gear teeth disposed thereon; the automatic voltage control assembly includes swing arm member pivotally connected to the first semi-collar and having a gear box and at least one gear, which is engageable with the plurality of gear teeth to cause pivotal movement of the swing arm member and the electrode associated with the voltage control assembly.

* * * * *